United States Patent
Shorey

(10) Patent No.: US 7,134,861 B2
(45) Date of Patent: Nov. 14, 2006

(54) EXTRUSION NOZZLE

(75) Inventor: Jeff Shorey, Yarmouth, ME (US)

(73) Assignee: Barber Foods, Portland, ME (US)

( * ) Notice: Subject to any disclaimer, the term of this patent is extended or adjusted under 35 U.S.C. 154(b) by 257 days.

(21) Appl. No.: 10/314,752

(22) Filed: Dec. 9, 2002

(65) Prior Publication Data

US 2003/0082254 A1 May 1, 2003

Related U.S. Application Data

(63) Continuation of application No. 09/496,161, filed on Feb. 1, 2000, now abandoned.

(51) Int. Cl.
*A21C 11/16* (2006.01)

(52) U.S. Cl. .................. 425/133.1; 425/191; 425/463; 426/283; 426/448; 426/516

(58) Field of Classification Search .......... 425/133.1, 425/380, 461, 462, 113, 114, 191, 463, 291; 426/516, 283, 448

See application file for complete search history.

(56) References Cited

U.S. PATENT DOCUMENTS

| 3,252,183 | A | * | 5/1966 | Bronzert | ................. 425/114 |
|---|---|---|---|---|---|
| 3,840,311 | A | * | 10/1974 | Wight | ................. 425/131.1 |
| 4,068,517 | A | * | 1/1978 | Fuchs, Jr. | ................. 72/253.1 |
| 4,132,756 | A | * | 1/1979 | Ferrentino et al. | ..... 264/171.16 |
| 4,152,102 | A | * | 5/1979 | Sasiela et al. | ............. 425/288 |
| 4,233,016 | A | * | 11/1980 | Chin et al. | ................. 425/288 |
| 4,292,018 | A | * | 9/1981 | Beale | ................. 425/144 |
| 4,469,475 | A | * | 9/1984 | Krysiak | ................. 425/132 |
| 4,574,690 | A | * | 3/1986 | Chiao et al. | ................. 99/353 |
| 4,702,687 | A | * | 10/1987 | Wheeler et al. | ............. 425/227 |
| 4,793,786 | A | * | 12/1988 | Greenhouse et al. | ..... 425/131.1 |
| 4,888,192 | A | * | 12/1989 | Ramnarine | ................. 426/448 |
| 5,492,706 | A | * | 2/1996 | Cockings et al. | ........... 426/282 |
| 5,527,179 | A | * | 6/1996 | Mochizuki | ................. 425/467 |
| 5,720,987 | A | * | 2/1998 | Ploog | ................. 425/131.1 |
| 6,068,796 | A | * | 5/2000 | Graham et al. | ............. 264/1.28 |
| 6,328,550 | B1 | * | 12/2001 | Sheen et al. | ............. 425/133.1 |

\* cited by examiner

*Primary Examiner*—Joseph S Del Sole
(74) *Attorney, Agent, or Firm*—Pierce Atwood LLP; Kevin M. Farrell

(57) ABSTRACT

An extrusion nozzle including an outlet port having a single opening with a first region, second region, and a pinched region between the two. The pinched region reduces the dimensions of the extrudate in relation to the dimensions associated with the first and second regions. In that way, the extrudate is joined together but may be easily separated into two separate pieces with dimensions related to the dimensions of the first and second region.

2 Claims, 4 Drawing Sheets

EXTRUSION NOZZLE

CROSS REFERENCE TO RELATED APPLICATIONS

This application is a continuation of application number 09/496,161, filed Feb. 1, 2000 now abandoned.

BACKGROUND OF THE INVENTION

1. Field of the Invention

The present invention relates to the formation of extruded products. More particularly, the present invention relates to processed food extrusion devices. The present invention is a single-head nozzle for shaped extrusions.

2. Description of the Prior Art

The mass production of formable products may be effected in a variety of ways including, but not limited to, by way of extrusion systems. An extruder is a device that forces mixed ductile or semi-soft solids through die openings of appropriate shape to produce continuous film, strips, tubing, or solid cylinders and polygons. The ductile or semi-soft solid is then subjected to further treatment, such as calendering, heating, etc., in order to finalize the shape and characteristics of the product created. Important aspects of the extrusion process necessary to ensure a product of acceptable characteristics include, but are not limited to: 1) the accuracy of the content of the mixture or formulation to be shaped or molded, 2) the viscosity of the formulation, 3) the rate of formulation flow through the extruder, and 4) the configuration of the nozzle, die, or head used to establish the preliminary shape of the extrudate prior to final processing.

Of particular interest in regard to the present invention is the configuration of the nozzle, die, or head used to establish the preliminary shape of the extrudate. The nozzle generally includes an inlet for receiving mixed material to be shaped. The nozzle also includes an opening with dimensions that fix the shape of the extrudate. For the most part, the inner dimensions of the nozzle are larger at the inlet than at the outlet. This arrangement is generally advantageous for the purpose of minimizing voids or air pockets in the extrudate. That is, the mixed material is compressed as it approaches the nozzle outlet, thereby forcing material into the voids or squeezing the voids to reduce their dimensions. It is to be noted that in most extrusion production processes, it is preferable to minimize voids in the extrudate.

Since void minimization is a goal in extrusion processes, the design of the nozzle outlet is critical, particularly as a function of the viscosity of the mixed material. For low-viscosity materials that set up almost immediately upon exiting the nozzle, the nozzle outlet configuration can be relatively complex. For more viscous materials, it is difficult to have a complex outlet configuration and still minimize voids. For that reason, among others, viscous mixtures are typically extruded through nozzle outlets of fairly simple dimensions.

In the field of prepared foods, extrusion techniques are used to create shaped items from large volumes of mixed material. After extrusion, the shaped items are further processed and packaged. These prepared food products are generally created from highly viscous mixed material that is shaped in the form of a rope, solid cylinder or solid pillow configuration. They may or may not include an encasement. It has generally been observed that these simple shapes result in minimum void creation in prepared food products.

Prepared food products must be of a size and weight suitable for individual consumption and they must be offered at prices competitive with similar food that is prepared at home. A hand-held prepared food product, for example, cannot be so large as to become unwieldy, yet it must be large enough to satisfy the targeted consumer class (i.e., adult or child). It has been determined that the rope shape is generally suitable for that purpose. The rope may be extruded and then cut into pieces of selectable length for additional processing. That processing may include crimping or folding of the cut ends and cooking, among other steps.

Unfortunately, the single tube or rope shape may not be suitable in the formation of all prepared and packaged food products that are acceptable to consumers and cost effective for the manufacturer to create. It is of increasing interest to form the prepared food as a pair of ropes joined together in a manner that allows them to be separated from one another easily and with minimal violation of the contents of the encasement. This arrangement allows for an increase in the quantity of the food within efficient package dimensions. If the product is to be formed as a pair of side-by-side rope shapes that are coupled together, the processing is substantially more involved. That is, either pairs of cut rope sections must be moved from an extrusion conveyor platform to a separate coupling stage, or two separate mix-and-extrude lines must be placed side-by-side. The first option adds considerably more processing delay and room for significant error in the coupling of the rope pairs. The second option requires the addition of a second mix and extrusion line and still requires a coupling together of the rope pairs, although that may be done on a single conveyor platform. These additional processing requirements increase the cost associated with creating prepared foods through an extrusion process.

Therefore, what is needed is a food preparation system and method that includes an efficient extrusion stage. What is needed is an extrusion stage that permits the formation of what is effectively a pair of side-by-side extrudates coupled together. Further, what is needed is an extrusion nozzle that creates such an extrudate with minimal void formation. More generally, what is needed is an extrusion nozzle and related processing for forming extrudates of coupled pairs.

SUMMARY OF THE INVENTION

It is an object of the present invention to provide a food preparation system and method that includes an efficient extrusion stage. It is an object of this invention to provide an extrusion stage that permits the formation of what is effectively a pair of side-by-side extrudates coupled together. Further, it is an object of the present invention to provide an extrusion nozzle that creates such an extrudate with minimal void formation. More generally, it is an object of the present invention to provide an extrusion nozzle and related processing for forming extrudates of coupled pairs.

These and other objects are achieved in the present invention with an extrusion nozzle having a single opening shaped to form a coupled pair of shaped ropes. The nozzle includes an inlet end, an outlet end, and an interior therebetween. The inlet end is designed to be couplable to a mixing head of any type used in the materials or food processing industries. The inlet end receives unitary mixed or solitary material for transmission through the nozzle interior to the outlet end. The interior may be formed in a tapered manner so that the interior dimensions are larger at the inlet end and smaller at the outlet end. This configuration preferably acts to compress the material to be extruded so as to minimize voids therein.

The outlet end of the nozzle is preferably configured as a single opening having a pinched region creating a minimal dimension of the material forced through the opening. On either side of the pinched region the opening dimensions increase so that a pair of connected rope-like shapes are created during the extrusion process. The pinched region acts to couple the two rope-like shapes together in a single extrusion step. The dimensions of the nozzle outlet opening used to create the rope-like shapes may be sized and configured as desired, including in a manner that makes the extrudate symmetrical or asymmetrical in appearance.

The present invention further includes an optional inner extrusion nozzle that may be placed within the extrusion nozzle with pinched region previously described. The inner nozzle includes a plurality of outlet openings at an outlet end through which material may be extruded. The material that may be extruded through the inner nozzle is designed to be encased within a material to be extruded through the outer primary extrusion nozzle. The inner nozzle is couplable at an inlet end to a mixer head or ducting that is separable from the mixer head and ducting associated with the material that passes within the interior of the primary extrusion nozzle. The material associated with the primary extrusion nozzle preferably passes around the inner nozzle such that the first inner material and the second encasing material are combined in a surrounding manner only at the exit of the outlet of the primary extrusion nozzle.

The related manufacturing process of the present invention involves the introduction of one or more mix components into a mixing unit, such as a conventional food processing mixer head. The mixer head is preferably coupled to means for forcibly moving the mixture into the single-head nozzle of the present invention. The mixture is forced into the inlet opening and through the outlet opening so as to form an extrudate of desired dimensions. The extruded mixture may then be directed to conventional final processing steps including, but not limited to thermal processing. Addition of the optional inner nozzle enables formation of an encased extrudate wherein a first material passes within the inner nozzle and through the primary extrusion nozzle outlet, and a second encasing material passes around the inner nozzle and out through the primary extrusion nozzle outlet.

These and other advantages of the present invention will become apparent upon review of the following description and the accompanying drawings.

DESCRIPTION OF THE INVENTION

Figure 1:
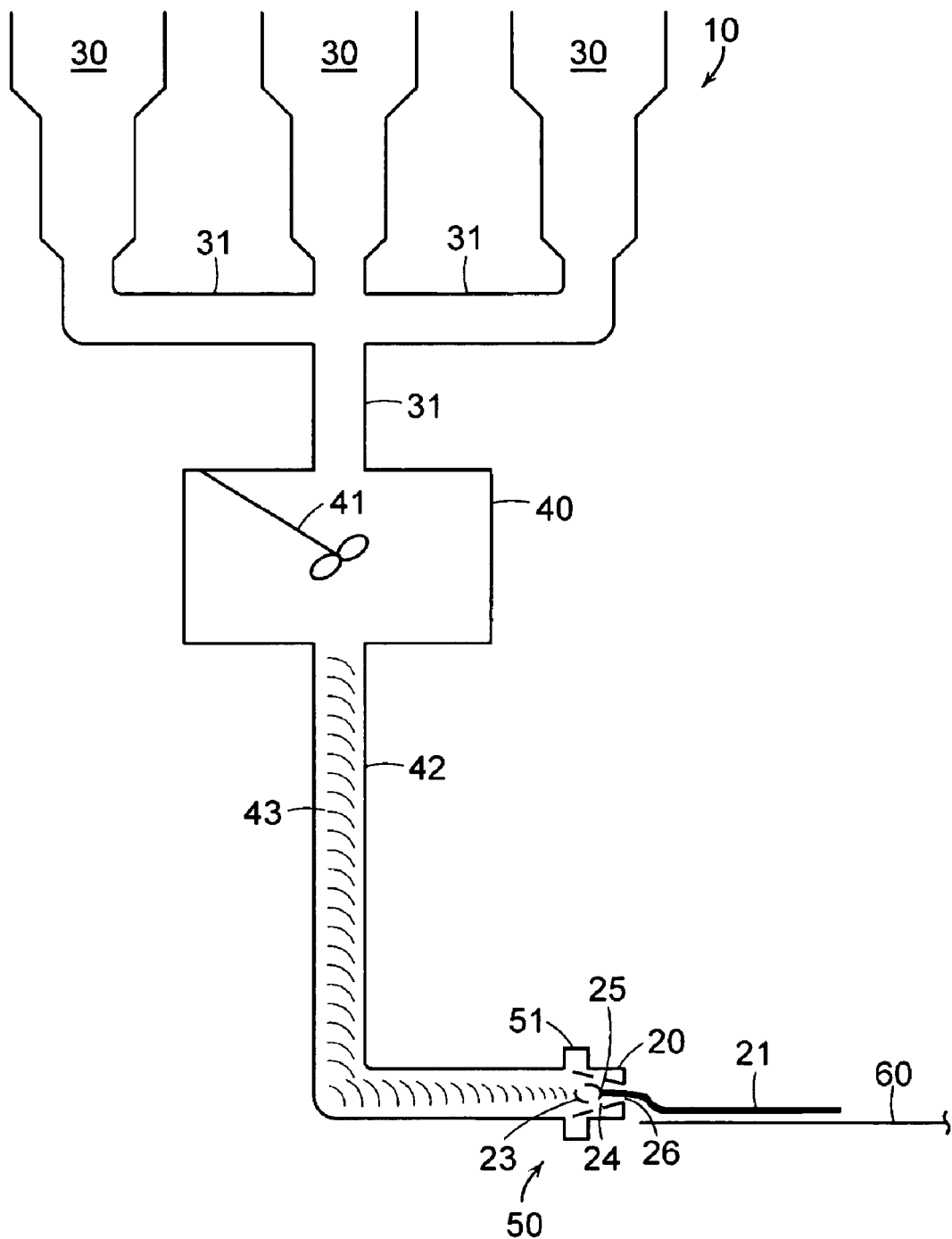
FIG. 1 is a simplified diagrammatic representation of a material extrusion system of the present invention, showing the system for extruding a unitary material.

A material processing system 10 of the present invention is shown in FIG. 1. The system 10 includes an extrusion nozzle 20 designed to create an attached paired rope extrudate shown generically as extrudate 21. The extrusion nozzle 20 is the primary component of the present system 10; however, the system 10 also includes commonly used materials processing equipment including, but not limited to, one or more material component delivery hoppers 30, component delivery piping or ducts 31, a mixer unit 40 with mixer 41, and mixed material delivery piping 42. The delivery piping 42 acts to transfer mixed material 43 from the mixer 40 to an extrusion head 50 that includes the extrusion nozzle 20 and a coupling flange 51. The mixed material 43 may be directed through the delivery piping 42 to the extrusion head 50 by way of a pumping device associated with the mixer unit 40. It is to be understood that the mixed material 43 may be formed of one or more components and may be any form of semi-solid, semi-soft, or otherwise ductile material including, but not limited to, viscoelastic materials and processed foods.

The extrusion nozzle 20 is preferably coupled to the coupling flange 51 by any coupling means, such as compatible inner and outer threading. The extrusion nozzle 20 includes an inlet port 22 for receiving the mixed material 43 from the mixer unit 40. An interior region 24 of the nozzle 20 is designed to retain a charge of mixed material 25 to be forced through an outlet port 26 of the nozzle 20. The design of the outlet port 26 fixes the shape of the extrudate 21 exiting the nozzle 20. The extrudate 21 preferably passes onto a conveyor platform 60 for delivery to subsequent processing stages (not shown). These subsequent stages may optionally include material cutting and heating units.

Figure 2:
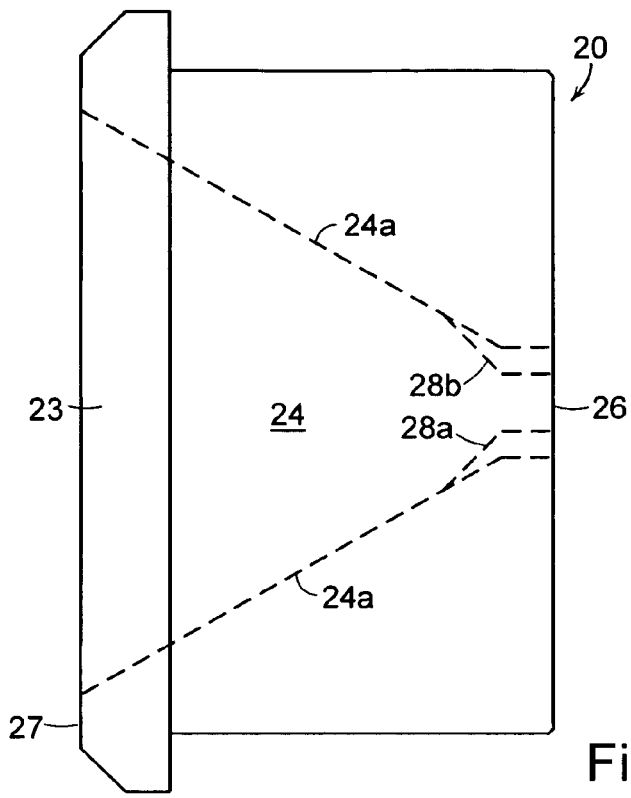
FIG. 2 is a side view of the extrusion nozzle of the present invention.

As illustrated in FIG. 2, the extrusion nozzle 20 includes the inlet port 23, the interior region 24, and the outlet port 26. The nozzle 20 further includes a delivery pipe coupling face 27 that is captured by the coupling flange 51 to retain the nozzle 20 thereto. A tapering of interior nozzle walls 24a in a conical or polygonal funneling fashion that forces mixed material toward outlet port 26 preferably forms the interior region 24. The nozzle 20 may be made of any material compatible with the material to be extruded including, but not limited to metals and viscoelastic materials having physical properties suitable to withstand the wear associated with commercial extrusion processing. One material found to be suitable for the purpose of food processing is ultra-high molecular weight polyethylene.

Figure 3:
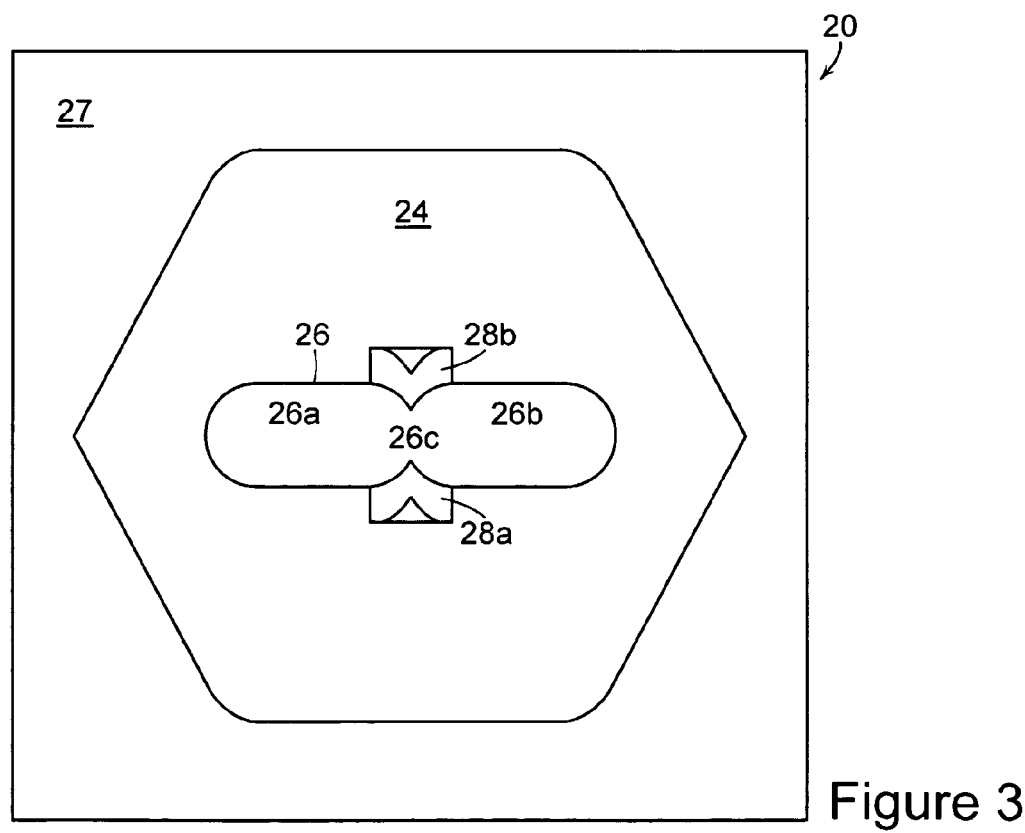
FIG. 3 is a top view of the extrusion nozzle of the present invention, showing the outlet end.

As illustrated in FIG. 3, the outlet port 26 of the nozzle 20 is formed of a selectable configuration designed to ensure that the extrudate 21 comes out of that port in a shape of interest to the material processor. One particularly advantageous configuration of the outlet port 26 is shown in FIG. 3. For the purpose of forming a food-based extrudate 21 having the shape of a pair of coupled elongate ropes, such as for an individual serving to be packaged, the port 26 includes a first opening region 26a, a second opening region 26b, and a pinched region 26c therebetween. As can be seen in FIGS. 2 and 3 in particular, the dimensions of the pinched region 26c, for example the vertical height, are less than the dimensions of the first and second opening regions 26a and 26b. While shown as elongated or elliptical regions, it is to be understood that opening regions 26a and 26b may be more rounded or more slotted. They may also be shaped in a polygonal configuration. They may be symmetrical in relation to one another, or they may be asymmetrical, or in other words, the dimensions of the opening regions 26a and 26b may be equal or unequal. The configuration shown in FIG. 3 is for illustrative purposes only.

An important aspect of the design of the outlet port 26 shown in FIG. 3 when used to create a connected pair of ropes is the inclusion of the portions of the port 26 used to form the pinched region 26c. That region is preferably formed by incorporating into the inside of tapered interior nozzle walls 24a near the port 26 tapered regions 28a and 28b for forcing the mixed material 25 therebetween. The extent to which the tapered regions 28a and 28b extend into the pinched region 26c is selectable and dependent upon the viscosity of the material 25 and the specific shape of the extrudate 21 desired. The tapered regions 28a and 28b may be formed in any manner known by those skilled in the art of parts machining, as a function of the particular material or materials used to form the nozzle 20.

Figure 4:
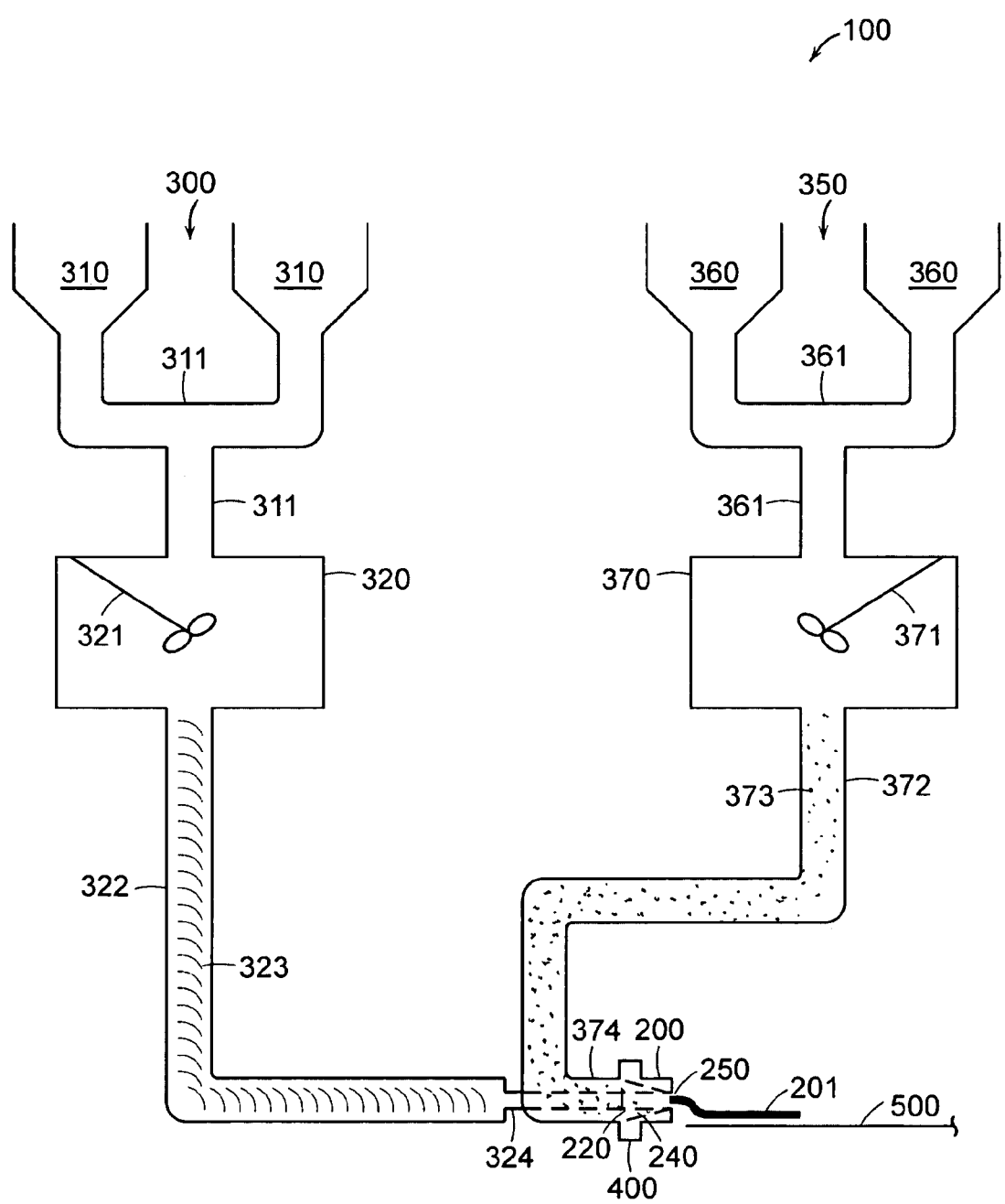
FIG. 4 is a simplified diagrammatic representation of a second material extrusion system of the present invention, showing the system for extruding a first material within a second material.

The system 10 shown in FIG. 1 and the nozzle 20 shown in FIGS. 2 and 3 are suitable for creating a unitary product as extrudate 21 in a selectable shape formed of a pair of coupled ropes. However, if there is an interest in combining two different mixed materials to form an extrudate wherein one of the materials is essentially completely surrounded by the other of the materials, an alternative process system and extrusion sub-system are required. As illustrated in FIG. 4, an alternative material processing system 100 of the present invention provides such capability. The alternative system 100 includes an extrusion nozzle structure 200 designed to create an attached paired rope extrudate shown generically as extrudate 201. In addition to the extrusion nozzle structure 200, the system 100 includes an inner material sub-system 300 and an outer material sub-system 350. The inner material sub-system 300 includes one or more inner material component delivery hoppers 310, inner material component delivery piping or ducts 311, a first mixer unit 320 with mixer 321, and mixed inner material delivery piping 322. The outer material sub-system 350 includes one or more outer material component delivery hoppers 360, outer material component delivery piping or ducts 361, a second mixer unit 370 with mixer 371, and mixed outer material delivery piping 372.

The delivery piping 322 acts to transfer mixed inner material 323 from the first mixer 320 to an inner extrusion head coupling pipe 324 that is coupled to an inner extrusion nozzle 220 of the extrusion nozzle structure 200. The delivery piping 372 acts to transfer mixed outer material 373 from the second mixer 370 to an outer extrusion head annulus 374 surrounding coupling pipe 324. The outer extrusion head annulus 374 is coupled to an outer extrusion nozzle 240 of the extrusion nozzle structure 200. The inner extrusion nozzle 220 is nested within the outer extrusion nozzle 240 such that the inner mixed material 323 travels within nozzle 220 and outer mixed material 373 travels in a surrounding manner around nozzle 220 within nozzle 240. The mixed materials 323 or 373 may be directed through their respective delivery piping by way of a pumping device associated with their respective mixers. It is to be understood that the mixed materials 323 and 373 may be formed of one or more components and may be any form of semi-solid, semi-soft, or otherwise ductile material including, but not limited to, viscoelastic materials and processed foods.

The extrusion nozzle 200 is preferably coupled to a coupling flange 400 by any coupling means, such as compatible inner and outer threading. The extrusion nozzle structure 200 includes a single outlet port 250 through which both the inner material 323 and the outer material 373 pass together as extrudate 201, with outer material 373 encasing inner material 323. The design of the outlet port 250 fixes the shape of the extrudate 201 exiting the nozzle structure 200. The extrudate 201 preferably passes onto a conveyor platform 500 for delivery to subsequent processing stages (not shown). These subsequent stages may optionally include material cutting and heating units.

Figure 5:
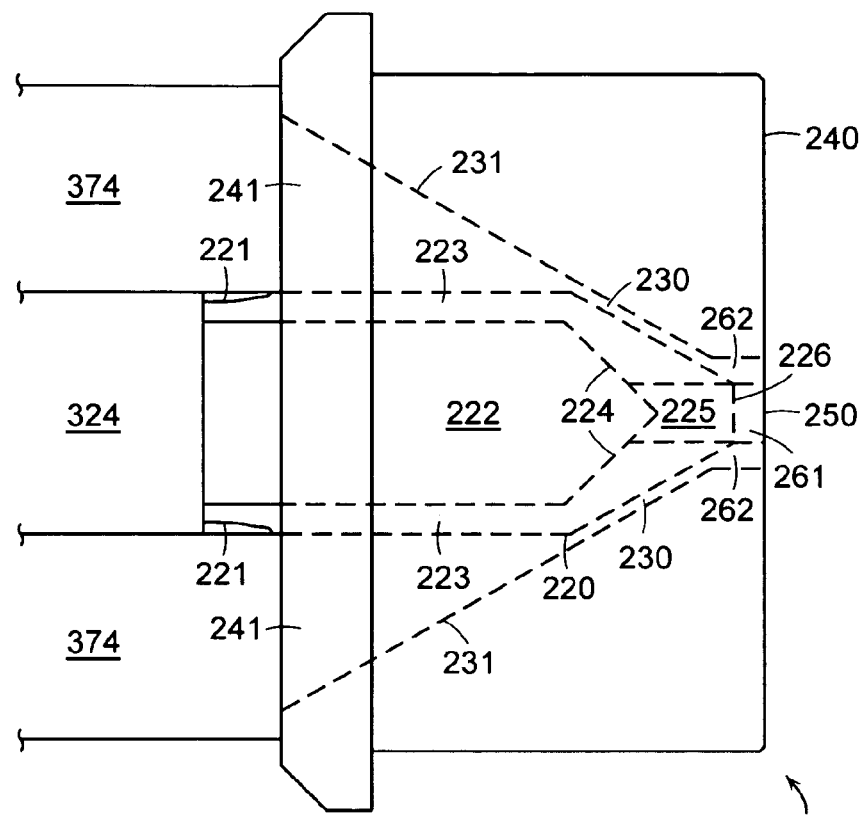
FIG. 5 is a side view of the alternative nozzle structure of the present invention for forming an extrusion having an inner material encased by an outer material.

As illustrated in FIG. 5, the alternative nozzle structure 200 includes inner nozzle 220 coupled to inner delivery piping 324 and outer nozzle 240 is coupled to annular piping 374. Inner nozzle 220 may be coupled to piping 324 by any suitable means including, but not limited to, nozzle threading 221. The connection to piping 324 fixes the spacing of inner nozzle 220 in relation to outer nozzle 240 such that the two are spaced apart by gap 230 through which outer material 373 is permitted to pass from piping 374 to outlet port 250. Inner nozzle 220 preferably includes interior region 222 for retaining inner material 323 within structural inner annulus 223. A tapered region 224 of the inner nozzle 220 acts to compress the material passing therethrough and forces it into intermediate output region 225.

The outer nozzle 240 is essentially the same as the extrusion nozzle 20 of FIGS. 1–3. That is, nozzle 240 includes an inlet port 241 and outlet port 250, with annular interior region 230 therebetween. The interior region 230 is preferably formed by a tapering of interior nozzle walls 231 in a conical or polygonal funneling fashion that forces mixed outer material toward outlet port 250. The outer nozzle 240 as well as the inner nozzle 220, may be made of any material compatible with the material to be extruded including, but not limited to metals and viscoelastic materials having physical properties suitable to withstand the wear associated with commercial extrusion processing. One material found to be suitable for the purpose of food processing is ultra-high molecular weight polyethylene.

With continuing reference to FIG. 5, the outlet port 250 of the outer nozzle 240 is spaced from an inner nozzle outlet 226 such that the inner material enters region 261 and is surrounded and substantially captured by the outer material at region 262. The configuration of the outlet port 250 is preferably substantially the same as that shown for nozzle outlet port 26 shown in FIG. 3. Of course, alternative configurations may be created, as previously noted.

Figure 6:
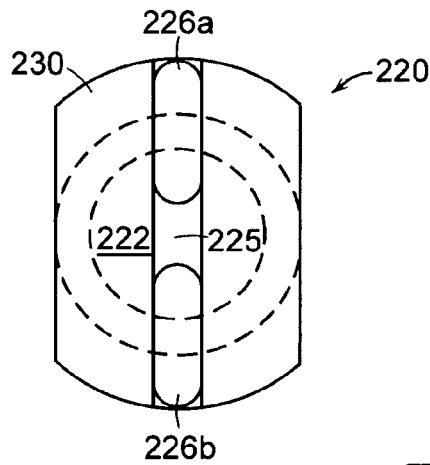
FIG. 6 is a top view of the optional inner extrusion nozzle of the present invention.
Figure 7:
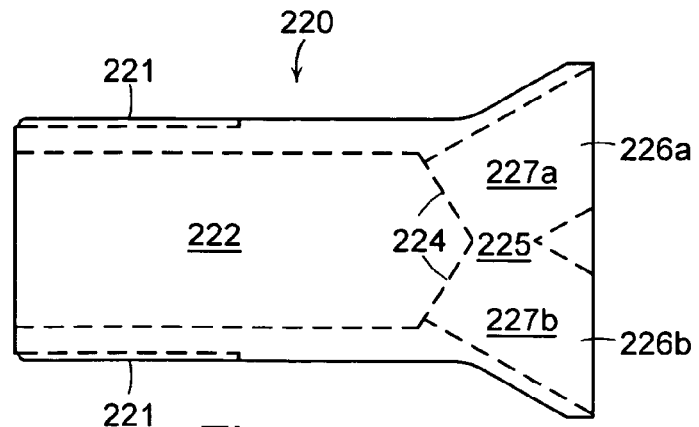
FIG. 7 is a side view of the optional inner extrusion nozzle of the present invention, showing the split material delivery pathways.

As illustrated in FIGS. 6 and 7, the inner nozzle 220 preferably includes at outlet 226 a first outlet port 226a and a second outlet port 226b. These split ports act to provide two separate ropes of inner material 323 that may be encased in a single joined extrudate 201 including a single outer material covering. The pinched region of the outer nozzle 240 as shown in FIG. 3 and the separation of region 225 of the inner nozzle 220 into two separate material transfer pathways 227a and 227b ensures that only the outer material 373 will be located at the center portion of the extrudate 201 between two coupled ropes that include the inner material 323 surrounded by the outer material 373. In this way, after final processing of the extrudate 201, that finished product may be easily separated into two separate pieces wherein the inner material is substantially encased in the outer material for the two separate ropes.

While the invention has been described with reference to particular example embodiments, it is intended to cover all modifications and equivalents.

What is claimed is:

1. A multiple extrusion nozzle comprising:

a. an outer extrusion segment said outer extrusion segment comprising an outer surface, an opening, an inner surface, a hollow section defined by said inner surface and an outer extrusion port comprising an inner wall, said hollow section terminating at one end at said opening and at the opposite end at said outer extrusion port, and b. an inner extrusion segment comprising a threaded section, a shaped body, two channels and one inner extrusion port comprising two axially adjacent inner port openings and an outer wall, said shaped body terminating at one end at said threaded section and at the other end at said inner extrusion port and said channels being interspaced within said shaped body and having diverging axes which originate at a point between said threaded section and said inner extrusion port and terminating at said two inner port openings, said channels being aligned with said two inner port openings, and wherein said inner extrusion segment is inserted into said hollow section of said outer extrusion segment such that said inner extrusion segment and said outer extrusion segment are aligned radially forming an annular space defined by said inner wall of said outer extrusion port and said outer wall of said inner extrusion port.

2. The multiple extrusion nozzle of claim 1 further comprising a set of indentations at opposing positions on said inner surface of said outer extrusion segment wherein said set of indentations is aligned adjacent to corresponding inner port openings.

* * * * *